United States Patent [19]

Olds et al.

[11] Patent Number: 4,862,477

[45] Date of Patent: Aug. 29, 1989

[54] APPARATUS AND METHOD FOR MELTING AND HOMOGENIZING BATCH MATERIAL

[75] Inventors: Leonard E. Olds, Castle Rock; Michael D. Peterson, Parker, both of Colo.; Jean P. Martin, Villennes, France

[73] Assignee: Manville Corporation, Denver, Colo.

[21] Appl. No.: 239,829

[22] Filed: Sep. 1, 1988

[51] Int. Cl.[4] .............................................. H05B 7/00
[52] U.S. Cl. ....................................... 373/85; 373/36; 373/52
[58] Field of Search ...................... 373/85, 86, 27, 52, 373/53, 54, 55, 36, 37, 38

[56] References Cited

U.S. PATENT DOCUMENTS

2,300,355 10/1942 Ellefsen .................................. 373/86
4,071,687 1/1978 Nakagawa et al. .................... 373/86

Primary Examiner—Roy N. Envall, Jr.
Attorney, Agent, or Firm—John D. Lister; Cornelius P. Quinn; Gregory A. Evearitt

[57] ABSTRACT

An electric furnace for melting batch material and mixing the molten material. Electrodes are used to create what is believed to be electromagnetically stirred active melting areas within the molten material. The molten material is stirred by moving the electrodes and furnace shell with respect to each other while the electrodes are positioned in a corona discharge relationship to the melt. This can be implemented by rotating the electrodes or the shell or by a compound movement caused by moving the electrode support arms toward and away from the center of the vessel in timed relationship to pivotal movement of electrode support arms so as to cause the electrode tips to traverse an arcuate path concentric with the center of the vessel. In a shallow immersion, simple pivoting of the electrode support arms is beneficial. To further decrease the dead area within a furnace vessel utilizing electrodes which are shallowly immersed, the vessel can be made polygonal as opposed to circular in lateral cross section. The support arms can also be vertically moved toward and away from the furnace bottom in any of the arrangements so as to cause additional stirring.

31 Claims, 6 Drawing Sheets

APPARATUS AND METHOD FOR MELTING AND HOMOGENIZING BATCH MATERIAL

FIELD OF THE INVENTION

This invention relates to the melting and homogenizing of batch material in an electric furnace. More particularly, it relates to improved methods of stirring and homogenizing the molten material through relative movement of the electrode tips which are positioned in a corona discharge relationship with the molten material.

BACKGROUND OF THE INVENTION

Electric furnaces have been used for many years to melt thermally fusible material such as ores, slags, glasses, oxides, rocks and oxidic waste materials, and a number of different furnace designs have been developed in an attempt to optimize the melting of the batch. In the case of ores and metallic-containing materials, graphite or carbon electrodes have been used in various combinations and configurations including single phase and multiphase operations with the electrodes either in an in-line configuration or in variations of a central delta-type arrangement. In the case of glass or oxide melting, deeply immersed electrodes of molybdenum, tungsten or tin oxide have been used, again in various geometrical and electrical phasing configurations.

When graphite or carbon electrodes are employed they are usually carried well above the liquid melt line, with the heat from the electrode arcs being absorbed by the surrounding batch or charge material. Furnace in which the depth of the batch material surrounding the electrode tips is over about six inches are known as "submerged arc" furnaces to characterize the fact that the arc column from the electrode tip to the melt surface is submerged by the batch material. One characteristic of submerged arc furnaces is that the electrode tips are positioned at a distance greater than ½ inch above the melt surface, usually on the order of 4 to 10 inches. This ensures that in such furnaces the heat is transferred directly from the arc column to the charge material rather than indirectly first to the melt surface and then to the charge material. While this configuration results in an efficient usage of heat, it is necessary that the charge material used in submerged arc furnaces be carefully prepared in size and consistency to allow reaction gases to safely escape as the charge column gradually melts and descends in the furnace.

In contrast to submerged arc furnaces, it is known to be able to operate furnaces with graphite or carbon electrodes immersed within the molten slag layer. However, immersion of uncooled carbonaceous electrodes more than about 2 inches in the melt is generally not desirable because of rapid reaction of the carbonaceous electrode material with the melt, giving rise to excessive electrode consumption. Cooling of carbonaceous electrodes as suggested in U.S. Pat. No. 2,591,709 to Lubatti is not a satisfactory method of obtaining deeper immersions because of excessive electrode skulling by the molten material and excessive heat losses to the electrode cooling liquid.

To utilize the advantage of close electrode coupling with the melt, but without undue electrode wear, it was specified in U.S. Pat. Nos. 2,805,929 and 2,805,930 to Udy that the electrode tips must be positioned from ½ inch above to no more than 2 inches below the melt surface. A formula was further developed in U.S. Pat. No. 3,522,356 to Olds et al. for the exact placement of the electrode tips according to the Udy configuration. The Olds et al. patent further noted than the electrical discharge from electrodes positioned in this manner was a corona-type discharge rather than an arc discharge.

It has been known, as pointed out in U.S. Pat. No. 2,744,944 to Striplin, Jr. et al. that the operation of submerged arc furnaces could be improved by slowly rotating the furnace shell while keeping the roof and electrode columns stationary. A number of submerged arc furnaces began to include shell rotation principally to allow the use of an increased amount of fine batch material in the furnace charge. It was felt that the very slow rotation kept the fine material from premature sintering, thus allowing the charge to be melted in a controlled manner rather than by causing the disastrous explosions frequently observed in nonrotating ferroalloy furnaces. The development of the rotating shell for such furnaces was directed exclusively toward a relative interaction between the electrodes and the surrounding batch material rather than between the electrodes and the molten bath. As a result, shell rotation times were very long, typically one to two days to complete a single revolution. This corresponds to angular speeds of from 0.1 to 0.2 degrees per minute.

In the case of glass and oxide melting, completely immersed metal and tin oxide electrodes have generally been employed rather than carbonaceous electrodes. For such melting applications, the electrodes have had many different shapes, including both rectangular and round, and have been placed in many different configurations with respect to each other. These electrodes have been made to be laterally or vertically adjustable as a means for altering melting conditions, and they have been designed to be inserted through the top, through the side walls or through the bottom of the furnaces. Examples of one or more of these features can be found in U.S. Pat. Nos. 2,089,690 to Cornelius, 2,686,821 to McMullen, 3,539,691 to Lucek, and 3,983,309 to Faulkner et al.

In addition, U.S. Pat. No. 4,351,054 to Olds discloses an arrangement which provides for optimal spacing of such immersed electrodes both laterally and vertically with respect to each other. The electrodes are mounted on support arms which extend over a furnace vessel with an open top, and the arms themselves are mounted for horizontal and vertical adjustment to enable the electrodes to be precisely positioned. The ability to locate the electrodes in their ideal location, taking into account such variables as the size of the furnace vessel, the magnitude of electrical power employed and the desired working temperature of the furnace results in improved melting rates and increased melter life.

Other means for developing improved melter performance have involved the use of the electrodes as mechanical agitators and stirring apparatus, examples of which can be found in U.S. Pat. Nos. 4,055,408 to Novak et al., 3,819,350 to Pellet et al., and 3,539,691 to Lucek. Such mechanical means for agitating and mixing melts have the obvious disadvantage of requiring electrical rotors for transferring electrical energy to the rotating electrode column. Such rotors are difficult to maintain, especially around hot, aggressive melter environments. Further, the viscous melts are difficult to move mechanically and require considerable amounts of energy to effect meaningful homogenization over the entire melter area.

Many other concepts for rotating either melter shells or ancillary equipment or both have been proposed from time to time, such as in U.S. Pat. No. 4,676,819 to Radecki et al. All of these proposals, however, fail to adequately homogenize the melt in the melter itself. What is needed is a simple economic means for improving the mixing and for more fully homogenizing the melt without the difficulties imposed by the suggestions of the prior art.

BRIEF SUMMARY OF THE INVENTION

It has been found that there are stirring forces, other than the thermal convection forces, normally associated with the electrical corona type discharges from electrodes that are in contact with the slag or oxidic melt layer. These other stirring forces are surprising in that they do not cause the melt to immediately rise to the melt surface, which they would do if their nature were only that of thermally convective forces. Rather, they cause the melt to be circulated horizontally outward toward the furnace walls where the melt is then cooled before it recycles to the center of the furnace. Since it is believed that these other forces are electromagnetic in nature, they are referred to herein as electromagnetic stirring forces. Such electromagnetic stirring has been found to be considerably more effective in mixing and homogenizing the melt than the normal thermal convective stirring previously thought to be the mixing forces solely associated with electrode heating.

It has further been found that these electromagnetic flow currents cause thermal reaction zones to form in melts the areas of which depend upon power loadings to the melter, the electrode configuration and the physical parameters of the melt, such as its melting point, viscosity, and the like. When the electrodes are progressively lowered toward the melt surface these reaction zones begin as circles concentric with the electrodes, as discussed in the article by W. M. Kelly in the April/May 1958 issue of *Carbon and Graphite News* entitled "Design and Construction of the Submerged Arc Furnace". However, when the electrodes touch the melt surface and then are lowered further into the melt, it has been found that the reaction zones surprisingly change in nature from the circular shapes described by Kelly to a horizontal distorted elliptical shape forming a circular delta shape. It has been found that this change is progressive, starting with the circular zones at the surface of the melt and transforming into the elliptical zones at the level of the electrode tips.

For electrodes with tips immersed more than three inches downward from the melt surface the actual three dimensional electromagnetic stirring effect has been found to be a combination of both types of reaction zones, the upper layers of the melt forming circular zones as influenced by the electrode legs passing through the melt surface and the lower zones forming the circular delta shape referred to above.

It has been found that with proper design and operational considerations the electromagnetic stirring forces can be used to considerably increase the efficiency of melting and homogenizing the resulting melts. By proper development of a controlled relative motion between the melt and electrodes, the reaction zones can be moved so as to effectively use the entire melter area for rapid and homogeneous melting of the batch.

There are many design considerations associated with the desired relative motions. Most desirably for circular furnaces either the electrodes or the shell might be rotated in the same direction continuously. Obviously the necessity for making electrical and cooling water connections to the electrodes makes continual single direction rotation of the electrodes difficult. On the other hand, low power density circular furnaces can utilize air cooled side walls and bottoms. Such furnace shells can be successfully rotated continuously in the same direction, provided the rotation times herein disclosed are utilized. The rotational direction may be successfully reversed so that either the electrodes or the shell may be moved concentrically with each other in one direction, and then the rotational direction reversed. If desired, both the shell and the electrodes can be moved simultaneously in opposite directions.

For optimum results it is important when the rotational directions are to be reversed that the angular distances traveled be equal to 360° divided by the number of electrodes being used. This provision allows the electromagnetic stirring patterns to most efficiently use the full melter area of circular melters.

Rotation of the shell is not feasible when continuous tapping through the side walls is desired. Also, if it is desired to use continuous tapping through a bottom orifice it is not possible to rotate the shell in a single direction because of problems associated with water cooling of the tap hole.

Various design features for attaining the desired relative movements of electrodes and shells are possible. For example, the electrodes can be fastened to an insulated suspension ring concentric with the furnace. As the ring rotates, not only will the electrodes rotate but the ring can also be used to spread batch on the surface of the melt.

However, in order to get the benefits of relative electrode movement without having the excessive expense of developing and implementing a furnace arrangement in which the electrodes circle the center of the vessel or in which the vessel itself moves, a plurality of electrodes are positioned in the furnace and are moved during operation of the furnace to increase the active melting area of the electrode tips and to produce a stirring effect on the molten material in the vessel. In a preferred embodiment the electrodes are mounted on support arms which extend over the top of the furnace. The arms are pivoted at a point remote from the furnace vessel so that the electrode tips move through an arc located between the central portion of the vessel and the side wall of the vessel over which the support arm extends. This action moves the melting circles produced by electrode tips immersed less than three inches downward from the melt surface through areas of the melter normally only poorly stirred during fixed electrode operation.

The active area of the melter can be further increased by providing a vessel the lateral cross-sectional area of which is polygonal rather than circular. Thus, for example, if three electrodes are shallowly located as in the arrangement described in the preceding paragraph, a vessel being a generally hexagonal cross section enables the melting zones to move through still more of the melter area.

Another embodiment of the invention provides for compound movement of electrode tips located more than three inches downward from the melt surface. Movement of the electrode tips toward and away from the central portion of the vessel in coordination with the pivotal or angular movement of the support arms, causes the electrode tips to move substantially along an arcuate path concentric with the central portion of the vessel. This arrangement effectively provides electrode movement comparable to that achieved by revolving electrodes about the center of the vessel without having to utilize the expensive equipment which would normally be required for producing such movement. In addition, the electrodes can be vertically moved in coordination with the pivotal movement of the support arms to effect a change from one reaction zone pattern to another reaction zone pattern which varies with the immersed depth to more effectively distribute the electromagnetic stirring forces.

Another feature of the invention provides for coordinated timed movement of the electrode tips so that as the electrode tips move they maintain an exact geometric balance with each other or a balance of equal phase resistance between the phases of polyphase electric currents.

Other features and aspects of the invention, as well as its various benefits, may be further ascertained from the more detailed description of the invention which follows.

DESCRIPTION OF THE PREFERRED EMBODIMENTS

Figure 1:
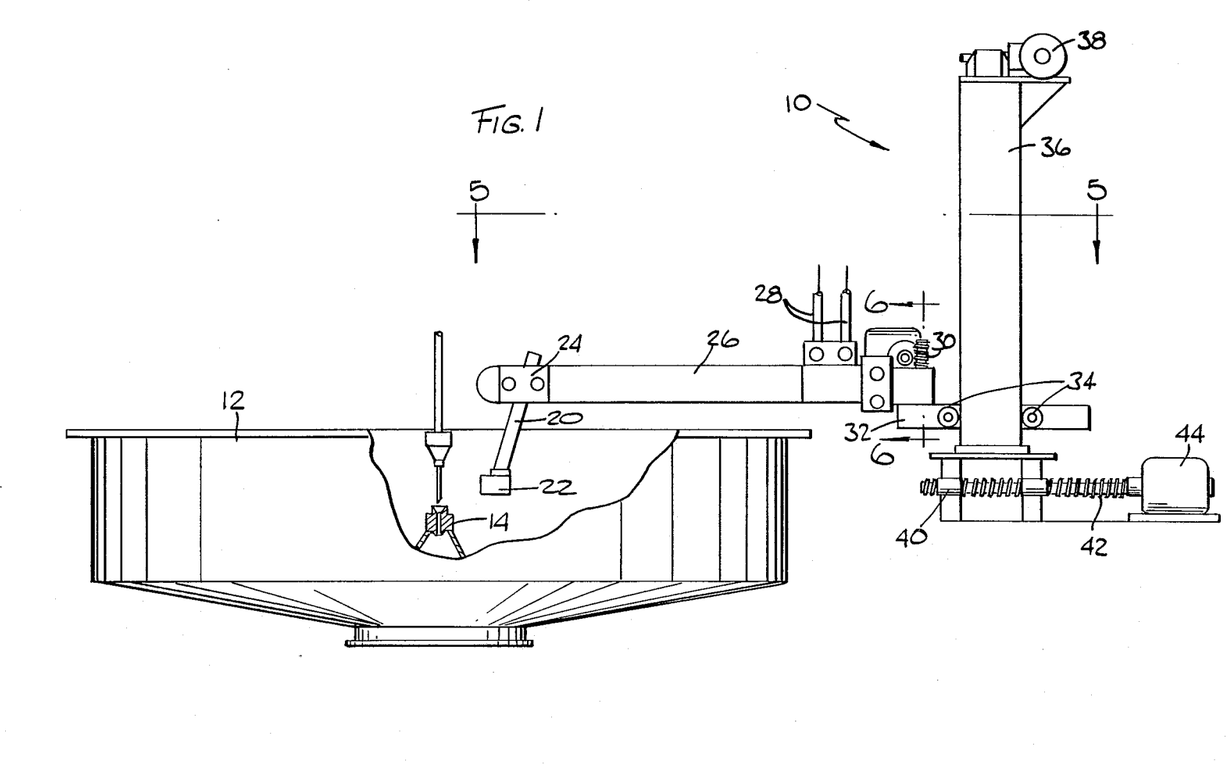
FIG. 1 is a side elevation of the electric furnace and associated apparatus of the invention, with some of the structural elements omitted for purpose of clarity.

Referring to FIG. 1, in one embodiment of the invention a furnace 10 comprises a vessel 12 having an outlet structure 14 in the central portion of the bottom wall thereof. A needle assembly 16 aligned with the outlet 14 is provided to control the opening and closing of the outlet as is well known in the art. An electrode 20 defining a leg portion having a tip 22 attached to its free end. The electrode 20 is mounted by a suitable clamp 24 or other attachment device near the free end of a support arm 26. Although the tip may be of any shape that will function in the desired manner, it is preferred that it be either round or rectangular, that is, that it be either round or rectangular in lateral cross section. The electrode 20 is electrically connected to a source of electrical power, not shown but well known in the art, through conductive lines 28 which are attached to the support arm 26. The support arm 26 is pivotally connected at 30 to a support plate 32. Although for purpose of clarity only one support arm and electrode assembly is illustrated in FIG. 1, it should be understood that a plurality of such assemblies are provided.

The support plate 32 carries guide rollers 34 to stabilize and facilitate vertical reciprocal movement along support column 36. The support plate is moved by means of motor 38 which powers a drive train arrangement as explained more fully hereinafter. The support column 36 carries threaded bushings 40 which engage with the screw 42. When the screw 42 is rotated by motor 44 the support column 36 will move toward or away from the vessel 12, causing the electrode 20 at the end of the support arm 26 to move in the same manner.

Figure 2:
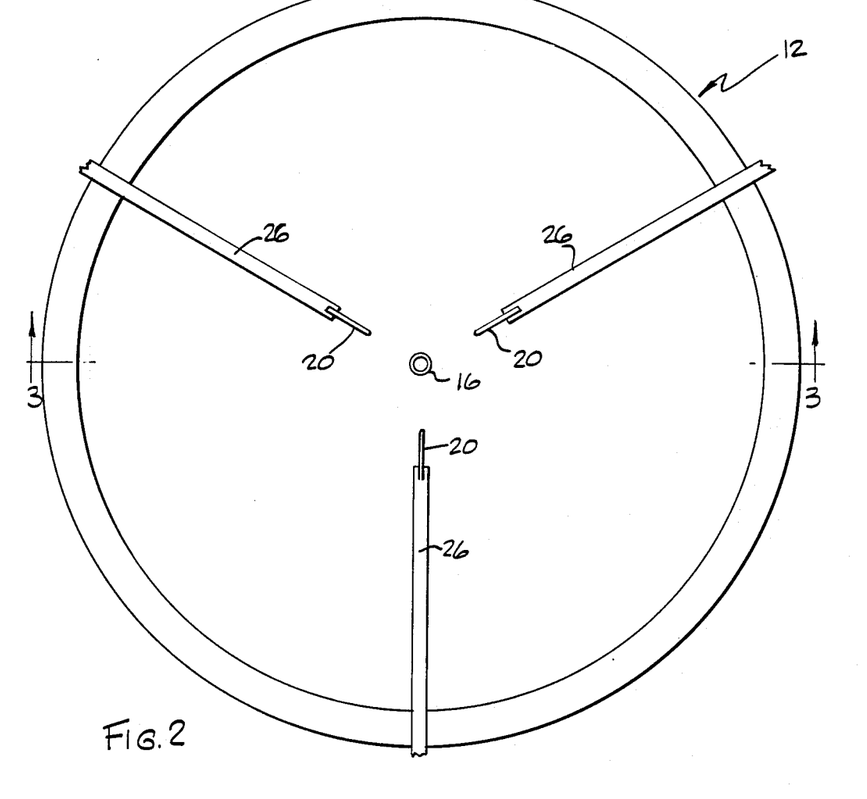
FIG. 2 is a plan view of the vessel of the electric furnace.
Figure 3:
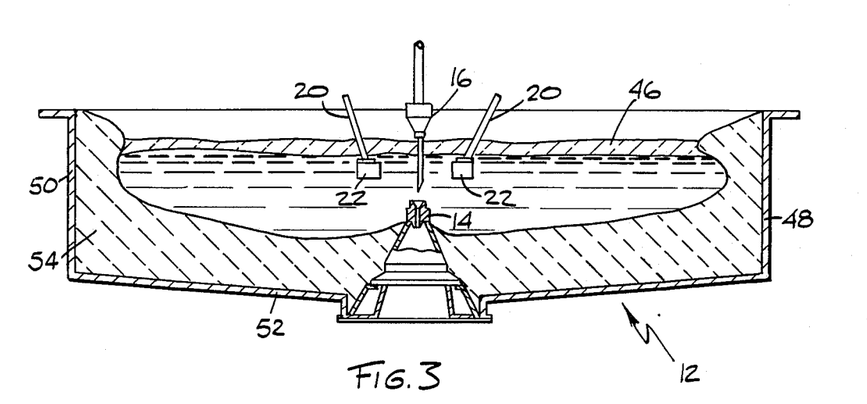
FIG. 3 is a transverse sectional view of the vessel taken on line 3—3 of FIG. 2.

As shown in FIGS. 2 and 3, the vessel 12 is circular in lateral cross section and there are three support arms 26, each carrying an electrode 20. The support arms 26 are arranged so that they are equidistant from the center of the vessel and from each other, being radially spaced 120° apart. The vessel is open at the top, allowing the electrodes to extend into the vessel and to be moved within the vessel as explained further hereinafter. As commonly operated, the batch material to be melted is continuously deposited by any suitable batch feed means, which is well known in the art, and forms a layer 46 of unmelted batch material. As the bottom surface of the layer melts and becomes part of the molten fused material, such as glass or refractory composition, additional batch material deposited onto the top of the layer maintains the thickness of the layer at a predetermined amount during the operation of the furnace. This layer absorbs heat escaping from the molten material to make the melting operation more efficient.

The outer surface of the vessel 12 is comprised of a standard type of metal shell 48 having side walls 50 and a bottom wall 52. The shell may be cooled by conventional means if desired. Insulating the shell is a layer of suitable refractory material 54 compatible with the molten material in the vessel. As is well known in the art, the refractory material may comprise a skull formed from the molten material.

Figures 4, 5, 6:
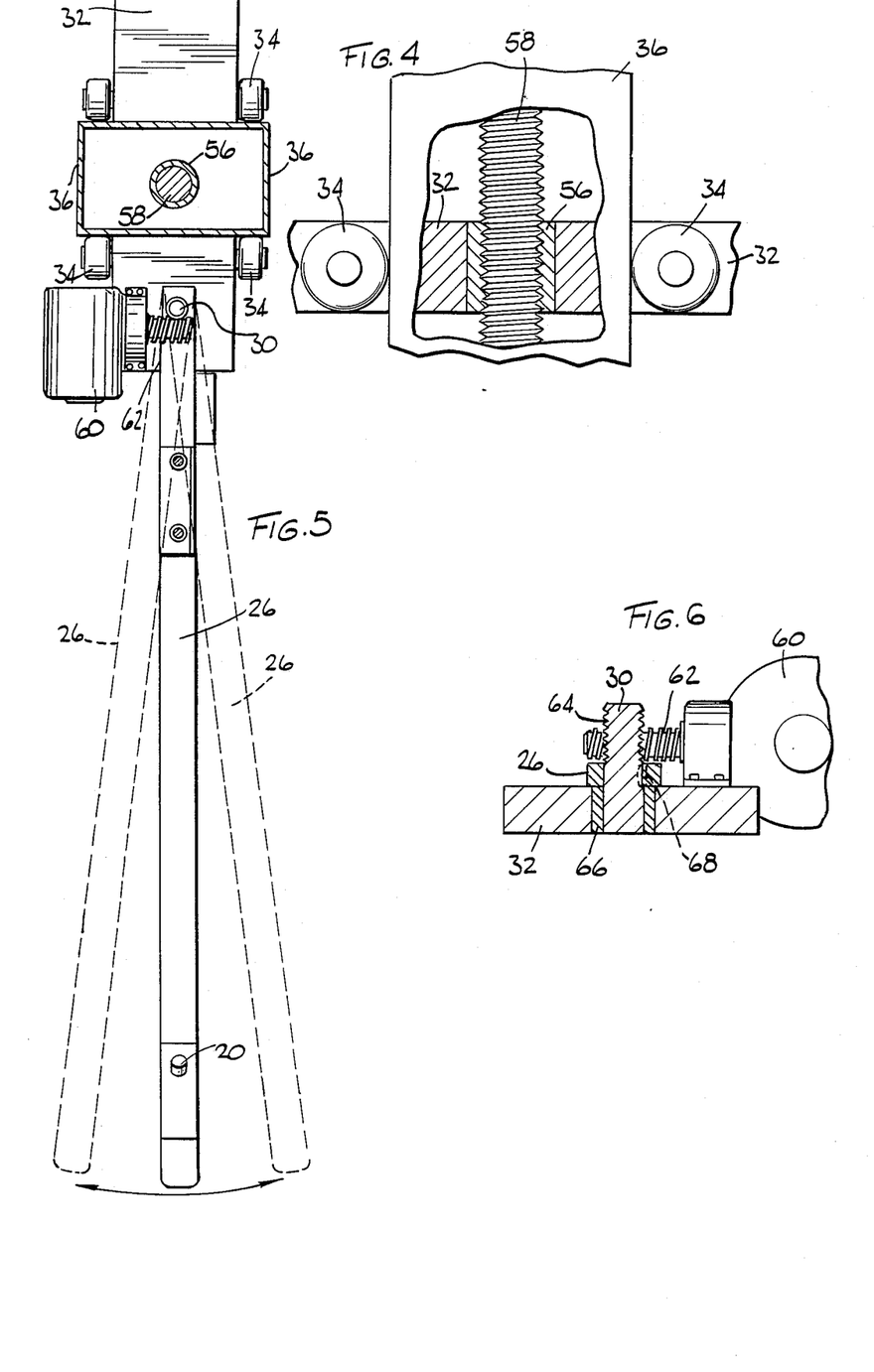
FIG. 4 is an enlarged partial side elevation, with portions shown in section, of the structure for raising and lowering the support arms.
FIG. 5 is a view taken on line 5—5 of FIG. 1, showing the support arm in plan view and certain elements of the support arm raising and lowering means in section.
FIG. 6 is a transverse sectional view of the support arm taken through the pivot of the arm on line 6—6 of FIG. 1.

Referring now to FIGS. 1 and 4, the support plate 32 contains an internally threaded bushing 56 engaged with screw shaft 58 which is caused to rotate in either direction through suitable connections to the motor 38. The bushing 56 may be rigidly connected to the plate 32 by any suitable means. Upon rotation of the screw 58 the plate will be caused to move up or down, carrying the support arm and electrode assembly with it. In this manner the position of the electrode tip 22 can be precisely located for optimum operation of the furnace and for another reason which will be made clear hereinafter.

As shown in FIGS. 1, 5 and 6, the support arm 26 is pivotally mounted on the support plate 32 by pin 30. Although any suitable means for pivoting the arm may be employed, one such means comprises a motor 60 mounted on the support plate 32 adjacent the end of the support arm 26. A screw 62 connected to the motor 60 engages the threaded upper end 64 of the pin 30. The other end of the pin 30 is pivotally received in a suitable bushing 66 in the support plate 32 while the middle portion of the pin is keyed to the support arm 26, as by a suitable key arrangement 68. Thus upon rotation of the screw 62, the pin 30 will rotate, causing pivotal movement of the connected support arm 26. By rotating the motor in opposite directions the support arm can be pivoted from its normal beginning position, shown in solid lines in FIG. 5, to the angled positions shown in dotted lines in FIG. 5.

Figure 7:
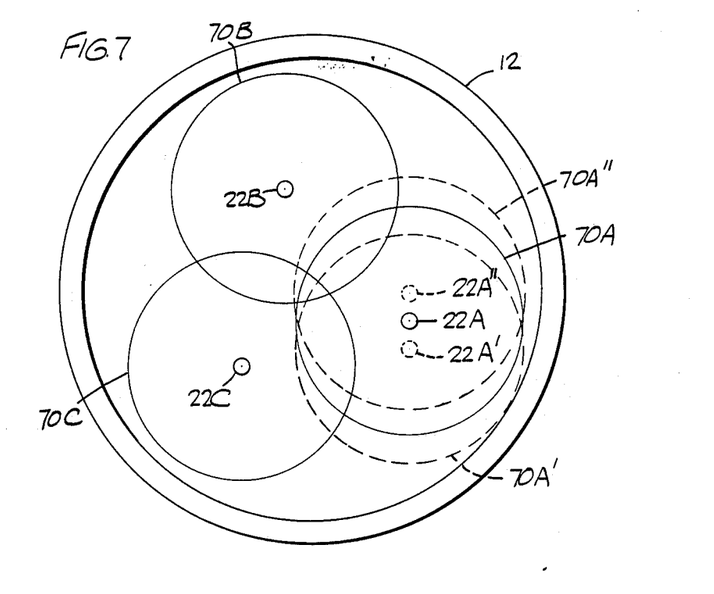
FIG. 7 is a diagrammatic plan view of the melting circles produced in the molten material by a three-electrode arrangement in accordance with one embodiment of the invention.

Referring now to FIG. 7, the circles 70A, 70B and 70C represent the horizontal boundaries of the melting circles or areas of active melting and electromagnetic stirring generated by the electrode tips 22A, 22B and 22C at a depth less than three inches below the melt surface. It will be appreciated that the locations of the electrode tips correspond to the three-electrode arrangement illustrated in FIG. 2, wherein the electrodes are equally radially spaced about the center of a vessel which is circular in lateral cross section. If the electrodes were to remain stationary the areas of active melting stirring would remain as shown, with all the remaining areas being essentially dead space in which the molten material is not properly stirred. By pivoting the support arm in the manner described above, however, the electrode tip 22A is moved from its original location to the locations shown in dotted lines labeled 22A' and 22A''. It can be seen from the circles 70A' and 70A'', which correspond to the electrode tip locations labeled 22A' and 22A'', that such movement enables the horizontal boundaries of the melting circles to be kept small in order to avoid excessive heating of the side walls of the vessel and yet be made to cover substantially more melting area than when the electrodes are stationary. The electrode tips 22B and 22C have not been shown in the locations corresponding to pivotal movement of their support arms in order not to clutter FIG. 7 and make it difficult to interpret, but it will nevertheless be understood that each of the melting circles 70B and 70C would move in a manner comparable to the movement of melting circle 70A. The overall effect of the electrode movements is to greatly increase the thermally active portion of the melter area without increasing heat losses to the side walls. The electrodes would all be moved synchronously along arcs defined by the pivotal movement of the support arms as the motors 60 alternately rotate the drive screws 62 in opposite directions.

Figure 8:
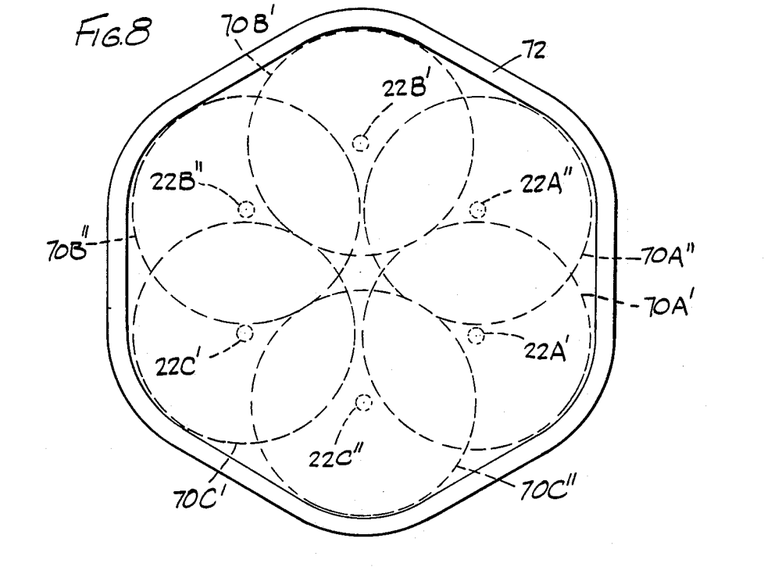
FIG. 8 is a diagrammatic view similar to that of FIG. 7, but showing a modified vessel arrangement.

In FIG. 8 a modified version of the pivoting shallow electrode arrangement of FIG. 7 is illustrated. In this arrangement a vessel 72 which is hexagonal in lateral cross section is utilized instead of a vessel of circular cross section. This leaves still fewer areas of the melter which are uncovered or unstirred by the melting circles generated by the electrodes. For the sake of clarity the electrode tips are not shown at their original starting positions, nor are the melting circles corresponding to the original starting positions of the electrode tips shown. The circles 70A' and 70A'' correspond, therefore, to the melting circles generated by the positions of extreme travel of the electrode tips, indicated in the drawing at 22A' and 22A''. Similarly, the circles 70B', 70B'', 70C' and 70C'' correspond to the melting circles generated by the electrodes 22B and 22C, indicated in the drawing at 22B', 22B'', 22C' and 22C''. However, it should be pointed out that, in both vessel configurations, the electrodes are moved relative to the vessel an amount such that the melting circles produced by one electrode overlap an area that included a melting circle produced by an adjacent electrode.

Although the three-electrode arrangement has been shown as being employed in connection with a hexagonally-shaped vessel, it should be obvious that other polygonally-shaped vessels could be used. In general, however, the number of sides to the polygon would be twice the number of electrodes.

Thus, for example, four electrodes carrying two single-phase currents would be used in an octagonally-shaped vessel.

Figure 9:
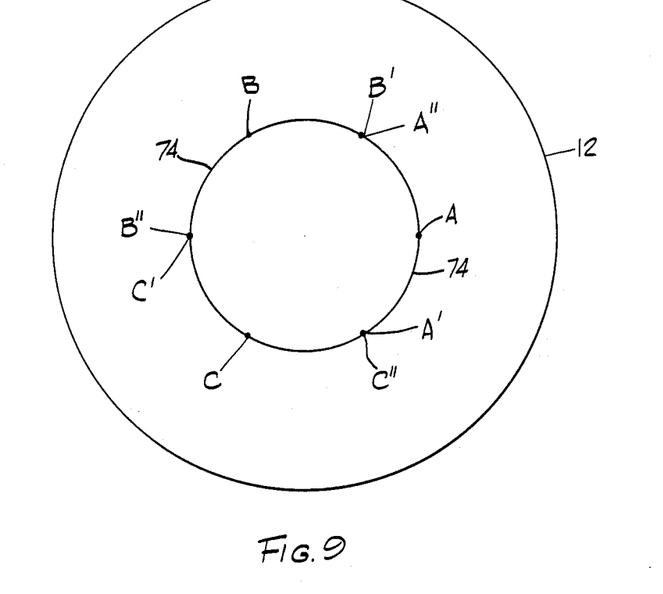
FIG. 9 is a diagrammatic plan view of the electrode movement in the melter in accordance with another embodiment of the invention.
Figure 10:
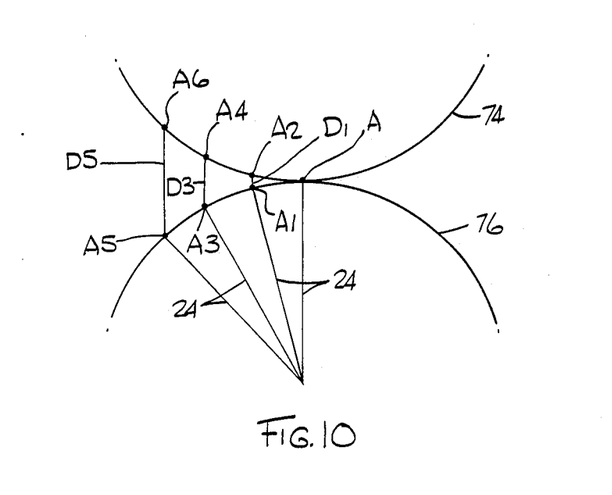
FIG. 10 is an enlarged view of a portion of the diagrammatic plan view of FIG. 9, showing in more detail the movement of the electrodes in the embodiment of FIG. 9.

Referring to FIG. 9, a circular vessel 12 and the starting positions of three electrode tips A, B and C are schematically shown. The circle 74 designates the path that would correspond to the path taken by electrodes revolving about the center of the vessel and would be the ideal path for the electrodes to take if the expense of the development and implementation of the necessary equipment were not excessively costly. In this regard it should be pointed out that the relative movement between the electrodes in the vessel results in separate electrodes being disposed at a common point relative to the vessel during such motion. (See point identified as C'' and A' for example). Thus, regardless of the depth at which the electrodes are immersed, circulation of the molten material about each electrode, as produced by electromagnetic stirring forces, defining 4246er circular or elipitical horizontal boundaries, would, in fact, produce an active melting zone that would overlap with the active melting zone of the next adjacent electrode. An enlarged view of the segment of the path 74 which is pertinent to the movement of electrode A is shown in FIG. 10. Also shown in FIG. 10 is the path 76 which the electrode tip would take when the support arm on which the electrode A is mounted is pivoted in the manner previously described. It is obvious that regardless of the advantageous pivotal or angular movement of the electrodes explained in connection with the other embodiments, the path 76 so produced does not follow the still more preferred concentric path 74.

In accordance with an embodiment of the invention, however, it is possible to closely approximate the ideal path 74 by means of the apparatus described above. Referring to FIGS. 9 and 10, and to FIGS. 1, 4, 5 and 6 as well, first the electrode tip A is located at a point in the melter corresponding to a point on the ideal path 74. This can readily be accomplished through appropriate movements of the support column 36 through motor 44 and pivotal movement of the support arm 26 through motor 60. Then the support arm is pivoted so that it moves an angular distance along path 76 to a point designated in FIG. 10 as A1, and the support column 36 is moved by motor 44 so that the support arm 26 moves toward the path 74 a distance corresponding to the distance D1. These movements place the electrode tip at point A2, which is on the ideal path 74. In like manner the support arm is pivoted to points A3 and A5 on the arc 76 and then moved toward the ideal path 74 the appropriate distance D3 and D5 in order to position the electrode tip on the ideal path at points A4 and A6. This series of movements would be continued until the electrode tip reaches point A' in FIG. 9, representing the most distant point on the ideal path 74 which the electrode tip A is able to reach by moving angularly in the direction toward electrode C. As explained above, this point coincides with the point C" in FIG. 9, which is the most distant point on the ideal path that the next electrode C is able to reach by pivotally moving in a direction toward electrode A. It can be seen that the three electrodes A, B and C, moving in the manner described, can together traverse the entire path 74 even though their normal pivotal movement would take them through an arc generally moving away from the center of the vessel. It will be appreciated that this arrangement would most likely be employed when utilizing deeply immersed electrodes the elliptical heat flow patterns of which cannot be effectively distributed by the simple pivoting movement of the electrodes described in connection with FIGS. 7 and 8.

The support arm movement just described can be made either by swinging the arm along the path 76 through a predetermined radial arc and then actuating the motor 44 to move the electrode tip to the ideal path 74, or by actuating the motor 44 while the support arm is slowly pivoting through its radial arc so that the tip in effect always stays on the path 74. In either case the operation of the motors 44 and 60 may be readily automatically controlled by a programmable logic controller the use of which is well known to those skilled in the art. It is thus possible to design programs and sensors that will allow the electrodes to move so that either an exact geometric balance is maintained between the electrodes or equal phase resistances are maintained between the individual phases of polyphase currents.

To confirm the expected results of the compound motion of the electrodes a number of thermal studies were made to determine the melting profiles of various furnace and electrode arrangements. In a first investigation three graphite electrodes, each being 12 inches in diameter, were spaced 120° circumferentially from each other in a 12-foot diameter furnace lined with 12 inches of refractory brick. The electrode centers were spaced 25½ inches from the center of the melter, and the electrode tips were immersed 1½ inches below the melt surface. The furnace was melting a charge of iron ore. A sufficient number of readings were taken by thermal probes at 2 inches below the melt surface to create a horizontal temperature profile. This profile revealed large stagnant areas of poor mixing and melting extending inwardly from the brick lining. The poorly melted and mixed areas were thinner between the lining and the electrodes and thicker intermediate the electrode locations. According to the invention, it would be expected that a suitable rotational speed of the electrodes around the furnace center would create electromagnetic flows which would move the hotter region behind the electrodes to the poor melting regions between the electrodes, thus improving the melt rates.

A second thermal probe measurement was made in a 10-foot diameter glass melting furnace lined with 9 inches of refractory brick. A typical soda-boron fiber glass batch was melted using three molybdenum electrodes spaced 22 inches from the furnace center. The electrode tips were 6 inches in diameter and were immersed 12 inches below the melt level. The power loading was 960 KW. Thermal probes were made at 2, 4 and 9½ inches below the melt level to determine the horizontal temperature profile at each level. In each case, although the specific profiles varied more from the circular to the distorted elliptical as the depth increased, substantial regions of stagnant poorly melted and poorly mixed areas extending inwardly from the side-wall were again found to exist. Again, in accordance with the invention, it would be expected that rotation of the electrodes around the furnace center would improve the uniformity of the melt at all layers, thus enhancing the melt rate and melt uniformity.

In addition to horizontal profiles, a vertical temperature profile was created from a sufficient number of temperature probes allowwing a complete cross section to be made. In this test a refractory composition was being melted in a five-foot diameter furnace in which three electrodes spaced 120° apart were spaced 3½ inches from a triangular center block containing the central bottom tapping orifice. The tip of each electrode was immersed 6 inches, and the furnace was operating with a power loading of 350 KW. The results showed a large poorly melted and mixed area which was basically elliptical in shape between the melt and the furnace wall and floor, extending up to the surface of the melt. Again, in accordance with the invention, it would be expected that rotation of the electrodes around the furnace center would improve the uniformity of the melt in vertical cross section.

To confirm the conclusions reached from the thermal profiles, tests were made in the five-foot diameter furnace referred to above using a melt composition of 59% $SiO_2$, 37% $MgO$, 3% $CaO$ and 1% $Al_2O_3$. The centers of the electrodes were spaced 10 inches from the center of the melter, and the electrode tips were immersed 6 inches below the melt surface. The furnace was equipped with three two-inch diameter molybdenum electrode legs with four-inch diameter by three-inch long molybdenum electrode tips. The melt was tapped continuously through a bottom central orifice. The furnace shell was held stationary and the electrodes were rotated around the center of the melter by a compound motion consisting of a small angular rotation of the electrode arm external to the melter and a small radial motion, so that the three electrode tips simultaneously described a circular motion around the melter center. The electrode tips traveled an angular distance of 60° in one direction from their starting position, then reversed directions back to their starting position, then continued on to a point 60° beyond the starting position in the opposite direction, then back 60° to their starting position. The compound motion was synchronized so that all three electrodes moved at the same angular speed and maintained the same relative positions with respect to each other at all times.

Five melting tests were made at various angular rotational speeds with the following results.

| Heat No. | 1 | 2 | 3 | 4 | 5 |
|---|---|---|---|---|---|
| Power Level, KW | 220 | 240 | 230 | 230 | 200 |
| Melt Rate, lbs/hr | | | | | |
| Without Rotation | 338 | 608 | 543 | 543 | 479 |
| With Rotation | 442 | 833 | 647 | 612 | 462 |
| Angular speed of Rotation, degrees/min. | 6.7 | 3.3 | 3.3 | 6.7 | 1.4 |
| Changed Melt Rate With Rotation, % | +31 | +37 | +19 | +13 | −4 |

As can be seen from the figures in the table, there was a dramatic improvement in melt rate at rotational speeds greater than about 1.5 degrees per minute. Optimum rotational speeds will depend, of course, upon the intensity of electromagnetic stirring, which in turn depends upon other factors such as power loading and melt viscosity.

Figure 11:
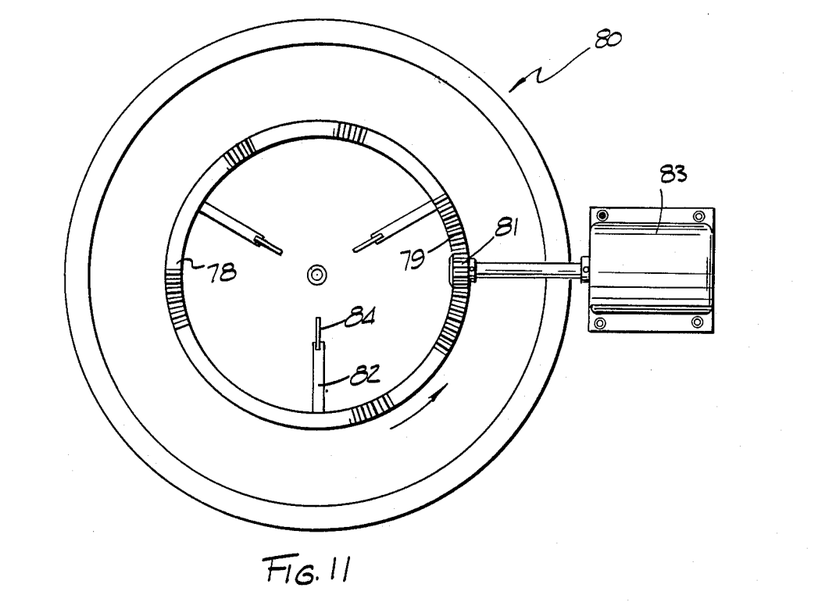
FIG. 11 is a simplified plan view of another embodiment of a melter and electrode arrangement providing for relative movement between the electrodes and the melter shell.

Although the compound electrode motion described is the preferred way of achieving circular movement about the center of the melter from the standpoint of economy, the same performance improvement can be expected by moving the electrodes about the center of the melter through simple rotational movement. As shown in FIG. 11, this may be achieved by providing a circular support ring 78 overlying the furnace 80. Any suitable means of imparting rotational movement to the support ring, such as suitable gearing, may be employed. For example, the ring 78 may be provided with teeth 79 about its periphery and a meshing gear 81, powered by a motor 83, may be used to rotate the support ring. Electrode support arms 82 are supported on the ring, as by suitable clamps, not shown, and each electrode support arm carries an electrode 84. By rotating the support ring 78 at the desired angular speed, the electrodes are moved in an arc about the center of the melter, thus bringing about more efficient melting and increasing the melt rate.

Figure 12:
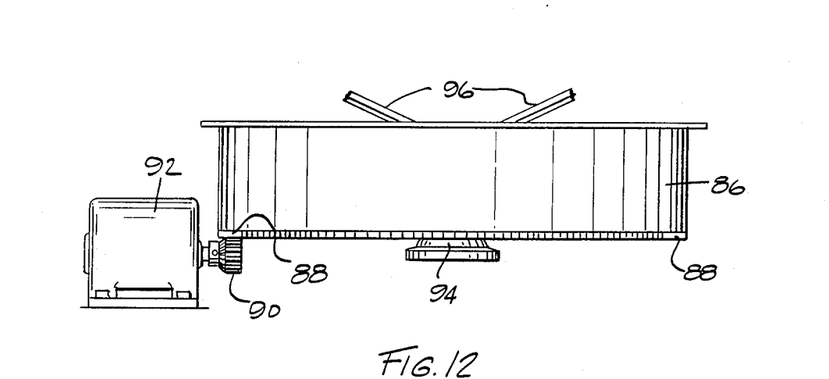
FIG. 12 is a simplified elevation of still another embodiment of a melter and electrode arrangement providing for relative movement between the electrodes and the melter shell.

As suggested earlier, the same result can be reached by mounting the electrodes on stationary supports and rotating the furnace shell. This arrangement is schematically shown in FIG. 12 wherein the furnace shell 86 is provided with a gear track 88 around its periphery. A mating gear 90 powered by motor 92 causes the shell to rotate about the pivot 94. Electrodes mounted on the stationary electrode support arms 96 would thus have relative rotational movement with respect to the rotating furnace shell and would provide the same benefits as in the FIG. 11 arrangement.

Still more mixing can be achieved by varying the vertical location of the electrode tips in the melt during movement of the electrodes in the manner described above to thus further vary the electromagnetic and thermal currents in the vessel.

It is not possible to give complete operating parameters for the method and apparatus of the invention since optimum conditions will change depending on the size of the installation, the material being melted, the number of electrodes, the power level and other variables. The initial electrode spacings, however, should preferably be those taught by Olds et al. in U.S. Pat. No. 4,351,054. Because of the different physical phenomenon utilized in this invention, the rotational speeds should be considerably faster than the 0.12 to 0.25 degrees per minute used in the submerged arc furnace technology. For example, in accordance with this invention rotational speeds less than about 1° per minute have actually been found to retard the melting process because of interference in the flow patterns of the melt. Rotational speeds in excess of 20° per minute have little effect on melt rate. These higher speeds could also have an adverse effect on melting if waves are formed which cause skulling and freezing of the melt surface. Even when optimum rotational speeds are used care must be taken to be sure that the melt is continually well covered by a layer of batch material in order to avoid excessive heat radiation as a result of electrode movement.

Although specific furnace designs have been disclosed as illustrations of equipment which can carry out the functions of the present invention, it should be understood than alternate ways of carrying out the various movements of the electrodes or shell can be employed. In general, therefore, although preferred embodiments of the invention have been described, changes to certain of the specific details of the embodiments may be made without departing from the spirit and scope of the invention, as defined in the appended claims.

What is claimed is:

1. An electric furnace for melting thermally fusible batch material and mixing the molten material produced thereby, comprising:
   a vessel containing batch material to be melted, the vessel having an outlet therein for discharging the molten material;
   a plurality of electrodes, each electrode having a leg portion teminating in a tip;
   means supporting each electrode so that each tip is positioned to generate a corona discharge from the electrode to within the molten material and producing thereby electromagnetic forces within an active melting zone of the molten material causing circulation of said material within said zone in generally horizontal paths, about said electrode; and
   means for causing relative movement between each electrode and the vessel, whereby said zones produced by said electrodes are moved in separate arcs within said molten material through an angle sufficient to distribute said active melting zones, and the stirring effect of the electromagnetic forces therein, to substantially throughout said material, and thereby provide generally uniform temperature distribution thoughout said molten material.

2. An electric furnace according to claim 1 wherein the relative movement between each electrode and the vessel is such that the active melting zone produced by one of said plurality of electrodes is moved through the molten material a distance sufficient to overlap an area of molten material that was within an active melting zone produced by another of said plurality of electrodes.

3. An electric furnace according to claim 2 wherein the horizontal boundary of the active melting zone produced by each electrode at substantially the surface of the molten material extends from generally adjacent the wall of the vessel to generally adjacent the center of the vessel.

4. An electric furnace according to claim 2 wherein said area of overlap occurs substantially throughout the vertical distance from the surface of the molten material to the level of immersion of the electrode tip.

5. An electric furnace according to claim 4, wherein the angular speed of the arcuate movement of said zones within said molten material is greater than ¼ degree per minute but less than 20 degrees per minute.

6. An electric furnace according to claim 5, wherein the minimum angular speed of the arcuate movement of said zones within said molten material is greater than 1 degree per minute.

7. An electric furnace according to claim 4, wherein the means for causing relative movement between the electrode and each vessel comprises means for fixing each electrode in place and means for rotating the vessel.

8. An electric furnace according to claim 4, wherein the means for causing relative movement between each electrode and the vessel comprises means for fixing the vessel in place, means positioned over each vessel for supporting the electrode, and means for rotating the supporting means.

9. An electric furnace according to claim 4, wherein the means supporting each electrode comprises a support arm extending over the vessel, and wherein the means for causing relative movement between each electrode and the vessel comprises means for periodically moving the support arms in timed relationship to each other to cause the electrode tips to move within the vessel in timed relationship to each other.

10. An electric furnace according to claim 9, wherein each support arm is pivotally movable about a point remote from the vessel and wherein the means for periodically moving the support arms pivots the arms about their pivot points.

11. An electric furnace according to claim 10, wherein the vessel has side walls and a central portion, each electrode tip being located between the central portion of the vessel and the side wall over which the associated support arm extends.

12. An electric furnace according to claim 11, wherein the vessel is generally circular in lateral cross section.

13. An electric furnace according to claim 12, wherein there are three electrodes.

14. An electric furnace according to claim 8, wherein the vessel is generally polygonal in lateral cross section.

15. An electric furnace according to claim 14, wherein there are three electrodes and wherein the vessel is generally hexagonal in lateral cross section.

16. An electric furnace according to claim 11, including means for moving the electrode tips toward and away from the central portion of the vessel in addition to the movement of the tips caused by the pivotal motion of the support arms.

17. An electric furnace according to claim 16, wherein the means for moving the electrode tips toward and away from the central portion of the vessel moves the electrode tips a predetermined distance coordinated with the pivotal movement of the support arms, whereby each electrode tip can move substantially along an arcuate path concentric with the central portion of the vessel.

18. An electric furnace according to claim 17, wherein the beginning of the arcuate path traversed by one of the electrode tips corresponds generally to the end of the arcuate path traversed by the next electrode tip, whereby the combined arcuate paths traversed by the electrode tips corresponds generally to a circle.

19. An electric furnace according to claim 16, wherein the means for moving the electrode tips toward and away from the central portion of the vessel comprises means for moving the support arm toward and away from the central portion of the vessel.

20. An electric furnace according to claim 11, including means for moving the electrode tips toward and away from the bottom of the vessel in addition to the movement of the tips caused by the pivotal motion of the support arms.

21. A method for melting thermally fusible batch material and mixing the molten material produced thereby, comprising the steps of:

introducing batch material into a vessel containing molten material and having an outlet therein for discharging the molten material;

positioning a plurality of electrodes, each having a tip, in a corona discharge relationship to the molten material, and thereby establishing within said molten material an active melting zone adjacent each electrode having electromagnetic forces circulating the molten material within said zone in generally horizontal paths about said electrode; and moving each electrode relative to the vessel along a path sufficient to subject substantially the entire molten material to said electromagnetic circulating forces thereby mixing the molten material to provide a generally uniform temperature distribution throughout the vessel.

22. A method according to claim 21, wherein moving each electrode relative to the vessel comprises moving all electrodes in a timed relationship to each other such that, at any given time the distance between the tips of adjacent electrodes is maintained substantially constant.

23. A method according to claim 22, wherein the vessel is generally circular in lateral cross section.

24. A method according to claim 22, wherein the vessel is generally polygonal in lateral cross section.

25. A method according to claim 22, wherein said path of movement is arcuate and the step of moving each electrode includes the step of moving the electrode tips toward and away from the central portion of the vessel in addition to the arcuate movement.

26. A method according to claim 25, wherein the movement of the electrode tips toward and away from the central portion of the vessel is coordinated with the movement of the tips along the arc to cause the tips to move substantially along an arcuate path concentric with the central portion of the vessel.

27. A method according to claim 26, wherein the beginning of the arcuate path traversed by one of the electrode tips corresponds generally to the end of the arcuate path traversed by the next electrode tip, whereby the combined arcuate paths traversed by the electrode tips corresponds generally to a circle.

28. A method according to claim 22, wherein the path of movement of the electrode tips is an arcuate path and the angular speed of relative motion is greater than $\frac{1}{4}$ degree per minute but less than 20 degrees per minute.

29. A method according to claim 28, wherein the minimum angular speed of rotation of the electrode tips is greater than 1 degree per minute.

30. A method according to claim 22, wherein the electrodes are moved in a timed relationship such that an exact geometric balance is maintained between the electrode tips.

31. A method according to claim 22, wherein the electrodes are moved in a timed relationship such that equal phase resistances are maintained between the phases of polyphase electric currents.

* * * * *